United States Patent
Sarmah et al.

(10) Patent No.: US 11,200,182 B1
(45) Date of Patent: Dec. 14, 2021

(54) SYSTEM AND METHOD FOR DEVICE SYNCHRONIZATION

(71) Applicant: Xilinx, Inc., San Jose, CA (US)

(72) Inventors: Mrinal J. Sarmah, San Jose, CA (US); Shreyas Manjunath, San Jose, CA (US); Prasun K. Raha, Palo Alto, CA (US)

(73) Assignee: Xilinx, Inc., San Jose, CA (US)

( * ) Notice: Subject to any disclaimer, the term of this patent is extended or adjusted under 35 U.S.C. 154(b) by 301 days.

(21) Appl. No.: 16/411,500

(22) Filed: May 14, 2019

(51) Int. Cl.
*G06F 13/16* (2006.01)
*G06F 13/40* (2006.01)
*G06F 9/46* (2006.01)

(52) U.S. Cl.
CPC .......... *G06F 13/1689* (2013.01); *G06F 9/467* (2013.01); *G06F 13/161* (2013.01); *G06F 13/4022* (2013.01); *G06F 2213/16* (2013.01)

(58) Field of Classification Search
None
See application file for complete search history.

(56) References Cited

U.S. PATENT DOCUMENTS

| | | | |
|---|---|---|---|
| 8,539,120 B1* | 9/2013 | Sha | H04N 19/433 710/53 |
| 2016/0314564 A1* | 10/2016 | Jones | G02B 17/086 |

FOREIGN PATENT DOCUMENTS

WO    WO-2007097038 A1 *   8/2007   ......... G06F 13/4252

OTHER PUBLICATIONS

Xilinx, Inc., AXI Reference Guide, User Guide, UG761, V13.1, Mar. 7, 2011, 82 pages, San Jose, CA USA.

* cited by examiner

*Primary Examiner* — Gary W. Cygiel
(74) *Attorney, Agent, or Firm* — Haynes and Boone, LLP

(57) ABSTRACT

A system includes a synchronizer circuit configured to monitor a first bus coupled between a memory and a first device to determine an occupancy threshold of the memory based on one or more write requests from the first device. The synchronizer circuit monitors a second bus between the memory and a second device to receive a first read transaction of a read request from the second device. The synchronizer circuit determines that the first read transaction is allowed to be sent to the memory based on the occupancy threshold of the memory. In response to the determination, the first read transaction is sent to the memory.

20 Claims, 8 Drawing Sheets

332

| Luma start address(es) 602 | Chroma start address(es) 604 | Control register 606 | Luma end address(es) 608 | Buffer margin 610 | Chroma end address(es) 612 | Interrupt status register 614 |

FIG. 6

SYSTEM AND METHOD FOR DEVICE SYNCHRONIZATION

TECHNICAL FIELD

Examples of the present disclosure generally relate to integrated circuits ("ICs") and, in particular, to embodiments related to synchronization between a device producing data and a device consuming the produced data.

BACKGROUND

In a video codec system, a plurality of component devices (e.g., a capture device, an encoder device, a network device, a decoder device, a display device, and/or any other suitable devices) may access the same memory extensively. As such, memory latency is one significant component of the overall system latency. Therefore, there is a need to optimize memory access by the plurality of devices of the system.

SUMMARY

In some embodiments in accordance with the present disclosure, a system includes a synchronizer circuit configured to monitor a first bus coupled between a memory and a first device to determine an occupancy threshold of the memory based on one or more write requests from the first device. The synchronizer circuit monitors a second bus between the memory and a second device to receive a first read transaction of a read request from the second device. The synchronizer circuit determines that the first read transaction is allowed to be sent to the memory based on the occupancy threshold of the memory. In response to the determination, the first read transaction is sent to the memory.

In some embodiments, to monitor the first bus to determine the occupancy threshold of the memory, for each write transaction of a write request detected on the first bus, the synchronizer circuit is configured to: determine a transaction size of the write transaction; and update the occupancy threshold based on the transaction size.

In some embodiments, the first read transaction is associated with a frame read request for reading a first frame of the video from the memory. The first read transaction starts to perform reading from the memory before the first frame is completely written to the memory.

In some embodiments, each write transaction is associated with a frame write request for writing a frame to the memory. The frame write request includes a plurality of write transactions for writing portions of the frame to the memory respectively.

In some embodiments, the first bus is an Advanced Extensible Interface (AXI) bus. The transaction size of the write transaction is determined based on a burst number indicating a number of data transfers in the write transaction.

In some embodiments, the synchronizer circuit is configured to: store the first read transaction in a first-in-first-out (FIFO) buffer. In response to the determination that the first read transaction is allowed to be sent to the memory, the synchronizer circuit retrieves a second read transaction from the FIFO buffer and send the retrieved second read transaction to the memory.

In some embodiments, the synchronizer circuit is configured to: in response to a determination that a second read transaction is not allowed to be sent to the memory based on the occupancy threshold of the memory, block the second read transaction from being sent to the memory.

In some embodiments, the first device includes a capture device for capturing a plurality of frames of a video and storing the plurality of frames in the memory. The second device includes an encoder device for retrieving the plurality of frames from the memory and encoding the plurality of frames.

In some embodiments, the first device includes a decoder device for decoding encoded frames of a video and storing the decoded frames in the memory. The second device includes a display device for retrieving the decoded frames from the memory for display.

In some embodiments, the system includes a capture device for capturing a plurality of frames of a video and storing the plurality of frames in the memory, an encoder device for retrieving the plurality of frames from the memory and encoding the plurality of frames, and a capture-encode synchronizer circuit configured to monitor third and fourth buses for scheduling one or more read transactions from the encoder device. The memory is coupled to the capture device and encoder device using the third and fourth buses respectively.

In some embodiments, a method includes monitoring a first bus coupled between a memory and a first device to determine an occupancy threshold of the memory based on one or more write requests from the first device; monitoring a second bus between the memory and a second device to receive a first read transaction of a read request from the second device; determining that the first read transaction is allowed to be sent to the memory based on the occupancy threshold of the memory; in response to the determination, sending the first read transaction to the memory.

In some embodiments, the monitoring the first bus to determine the occupancy threshold of the memory includes: for each write transaction detected on the first bus, determining a transaction size of the write transaction and updating the occupancy threshold based on the transaction size.

In some embodiments, the first read transaction is associated with a frame read request for reading a first frame of the video from the memory. The method includes starting to read data associated with the first read transaction from the memory associated with the first read transaction before the first frame is completely written to the memory.

In some embodiments, the method includes storing the first read transaction in a first-in-first-out (FIFO) buffer; in response to the determination that the first read transaction is allowed to be sent to the memory, retrieving a second read transaction from the FIFO buffer and sending the retrieved second read transaction to the memory.

In some embodiments, the method includes in response to a determination that the second read transaction is not allowed to be sent to the memory based on the occupancy threshold of the memory, blocking the second read transaction from being sent to the memory.

In some embodiments, the method includes capturing, by a capture device, a plurality of frames of a video and storing the plurality of frames in the memory; retrieving, by an encoder device, the plurality of frames from the memory and encoding the plurality of frames; and monitoring third and fourth buses for scheduling one or more read transactions from the encoder device, wherein the memory is coupled to the capture device and encoder device using the third and fourth buses respectively.

BRIEF DESCRIPTION OF THE DRAWINGS

FIG. 6 is a diagram illustrating exemplary programmable registers used in a synchronizer of the producer-consumer synchronization system of FIG. 3 according to some embodiments of the present disclosure.

DETAILED DESCRIPTION

Figure 1:
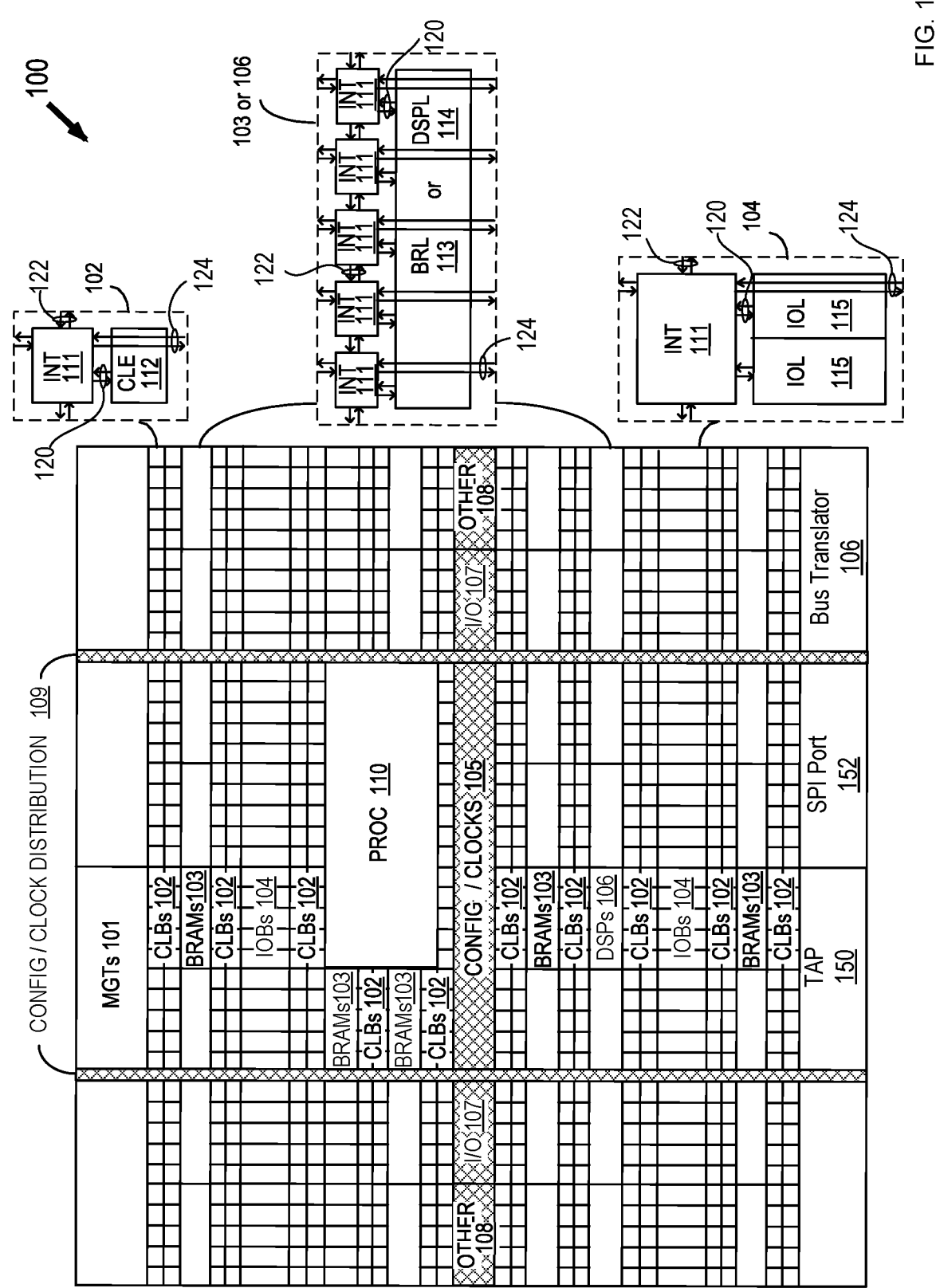
FIG. 1 is a block diagram illustrating an exemplary architecture for an IC according to some embodiments of the present disclosure.

Various embodiments are described hereinafter with reference to the figures, in which exemplary embodiments are shown. The claimed invention may, however, be embodied in different forms and should not be construed as being limited to the embodiments set forth herein. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described. The features, functions, and advantages may be achieved independently in various embodiments or may be combined in yet other embodiments.

Before describing exemplary embodiments illustratively depicted in the several figures, a general introduction is provided to further understanding. As discussed above, there is a need to reduce system latency in a video codec system. Typically, the plurality of component devices process on video frame (also referred to as frame) boundaries, and as such, each component device adds latency in the multiples of frame intervals. Among multiple component devices in the system that access the same memory, a frame buffer address of a particular frame in the memory may be shared (e.g., by using an application processor) to avoid memory copies. For example, the frame buffer address for a particular frame in the memory allocated by a capture device (e.g., using a frame buffer write device of the capture device) for writing an input frame buffer may be shared (e.g., by using an application processor) with an encoder device, which may fetch that particular frame from the same frame buffer address in the memory. As such, copying frame buffers is avoided, which optimizes the latency and processing throughput. Typically, synchronization between component devices may be handled based on interrupt. For example, the capture device may generate an interrupt signal after an input frame is written into the memory at a frame buffer address, and in response to the interrupt signal, the encoder device starts (e.g., using the encoder hardware) to fetch that input frame from the same frame buffer address from the memory. Such synchronization using interrupt signals adds a latency including a one-frame interval latency (e.g., the time it takes to write a frame to the frame buffer in the memory)

For integrated circuit (IC) solutions, it has been discovered that in each component devices, by processing (e.g., writing and/or reading) frames in transaction (e.g., memory read and/or write transactions according to a particular bus architecture protocol) boundaries instead of frame boundaries, latency of each component device is added in the multiples of transaction intervals instead of frame intervals. Because a transaction interval latency (e.g., the time it takes to write a transaction to the frame buffer in the memory) is much less than a frame interval latency, the latency is reduced Furthermore, by enabling the encoder device to start fetching a particular frame from the memory immediately after the capture device completes writing a first transaction of that particular frame into the memory, latency is further reduced.

Various advantages may be present in various applications of the present disclosure. No particular advantage is required for all embodiments, and different embodiments may offer different advantages. One of the advantages in some embodiments is that by eliminating handling interrupts at every frame (or frame slice where each frame slice of a frame may be encoded/decoded independently) boundary for initiating reading requests, the processor workload is reduced. Another of the advantages in some embodiments is that it enables a consumer component (e.g., an encoder device or a display device) to start immediately to fetch data from a memory based on a source address as soon as that source address is written into the memory. Yet another of the advantages in some embodiments is that such a synchronization method may be used to synchronize a producer and consumer pair (e.g., a capture device and encoder device pair, a decoder device and display device pair) for each individual video channel of a plurality of video channels in a multi-stream video system simultaneously. Yet another of the advantages in some embodiments is that the encoding latency, which is largely driven by the total encoder hardware processing latency, is reduced significantly (e.g., reduced from about 20 ms to about 3 ms for a 60 Hz video pipeline). It enables low glass to glass latency (e.g., less than 24 ms) such that the video codec system with inline encoding may be used in low latency or ultra-low latency applications including, for example, military, radar, and video conference applications. Yet another of the advantages in some embodiments is that the hardware implementation in a component device for processing on transaction boundaries may be independent of software implementation (e.g., processing on frame boundaries or transaction boundaries) in that component device.

With the above general understanding borne in mind, various embodiments for synchronizing data accesses to a memory by a plurality of devices are described below.

Because one or more of the above-described embodiments are exemplified using a particular type of IC, a detailed description of such an IC is provided below. However, it should be understood that other types of ICs may benefit from one or more of the embodiments described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or complex programmable logic devices (CPLDs). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

In general, each of these programmable logic devices ("PLDs"), the functionality of the device is controlled by configuration data provided to the device for that purpose. The configuration data can be stored in volatile memory (e.g., static memory cells, as common in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

As noted above, advanced FPGAs can include several different types of programmable logic blocks in the array. For example, FIG. 1 illustrates an exemplary FPGA architecture 100. The FPGA architecture 100 includes a large number of different programmable tiles, including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized/output blocks ("I/O") input 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile can include at least one programmable interconnect element ("INT") 111 having connections to input and output terminals 120 of a programmable logic element within the same tile, as shown by examples included at the top of FIG. 1. Each programmable interconnect element 111 can also include connections to interconnect segments 122 of adjacent programmable interconnect element(s) in the same tile or other tile(s). Each programmable interconnect element 111 can also include connections to interconnect segments 124 of general routing resources between logic blocks (not shown). The general routing resources can include routing channels between logic blocks (not shown) comprising tracks of interconnect segments (e.g., interconnect segments 124) and switch blocks (not shown) for connecting interconnect segments. The interconnect segments of the general routing resources (e.g., interconnect segments 124) can span one or more logic blocks. The programmable interconnect elements 111 taken together with the general routing resources implement a programmable interconnect structure ("programmable interconnect") for the illustrated FPGA.

In an example implementation, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the example of FIG. 1, an area (depicted horizontally) near the center of the die (e.g., formed of regions 105, 107, and 108 shown in FIG. 1) can be used for configuration, clock, and other control logic. Column 109 (depicted vertically) extending from this horizontal area or other columns may be used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, PROC 110 spans several columns of CLBs and BRAMs. PROC 110 can include various components ranging from a single microprocessor to a complete programmable processing system of microprocessor(s), memory controllers, peripherals, and the like.

In one aspect, PROC 110 is implemented as dedicated circuitry, e.g., as a hard-wired processor, that is fabricated as part of the die that implements the programmable circuitry of the IC. PROC 110 can represent any of a variety of different processor types and/or systems ranging in complexity from an individual processor, e.g., a single core capable of executing program code, to an entire processor system having one or more cores, modules, co-processors, interfaces, or the like.

In another aspect, PROC 110 is omitted from architecture 100, and may be replaced with one or more of the other varieties of the programmable blocks described. Further, such blocks can be utilized to form a "soft processor" in that the various blocks of programmable circuitry can be used to form a processor that can execute program code, as is the case with PROC 110.

The phrase "programmable circuitry" can refer to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, portions shown in FIG. 1 that are external to PROC 110 such as CLBs 102 and BRAMs 103 can be considered programmable circuitry of the IC.

In some embodiments, the functionality and connectivity of programmable circuitry are not established until configuration data is loaded into the IC. A set of configuration data can be used to program programmable circuitry of an IC such as an FPGA. The configuration data is, in some cases, referred to as a "configuration bitstream." In general, programmable circuitry is not operational or functional without first loading a configuration bitstream into the IC. The configuration bitstream effectively implements or instantiates a particular circuit design within the programmable circuitry. The circuit design specifies, for example, functional aspects of the programmable circuit blocks and physical connectivity among the various programmable circuit blocks.

In some embodiments, circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 110.

In some instances, hardwired circuitry can have one or more operational modes that can be set or selected according to register settings or values stored in one or more memory elements within the IC. The operational modes can be set, for example, through the loading of a configuration bitstream into the IC. Despite this ability, hardwired circuitry is not considered programmable circuitry as the hardwired circuitry is operable and has a particular function when manufactured as part of the IC.

FIG. 1 is intended to illustrate an exemplary architecture that can be used to implement an IC that includes programmable circuitry, e.g., a programmable fabric. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual IC, more than one adjacent row of CLBs is typically included wherever the CLBs appear, to facilitate the efficient implementation of user logic, but the number of adjacent CLB rows varies with the overall size of the IC. Moreover, the FPGA of FIG. 1 illustrates one example of a programmable IC that can employ examples of the interconnect circuits described herein. The interconnect circuits described herein can be used in other types of programmable ICs, such as CPLDs or any type of programmable IC having a programmable interconnect structure for selectively coupling logic elements.

It is noted that the IC that may implement the video codec system is not limited to the exemplary IC depicted in FIG. 1, and that IC having other configurations, or other types of IC, may also implement the video codec system.

Figure 2A:
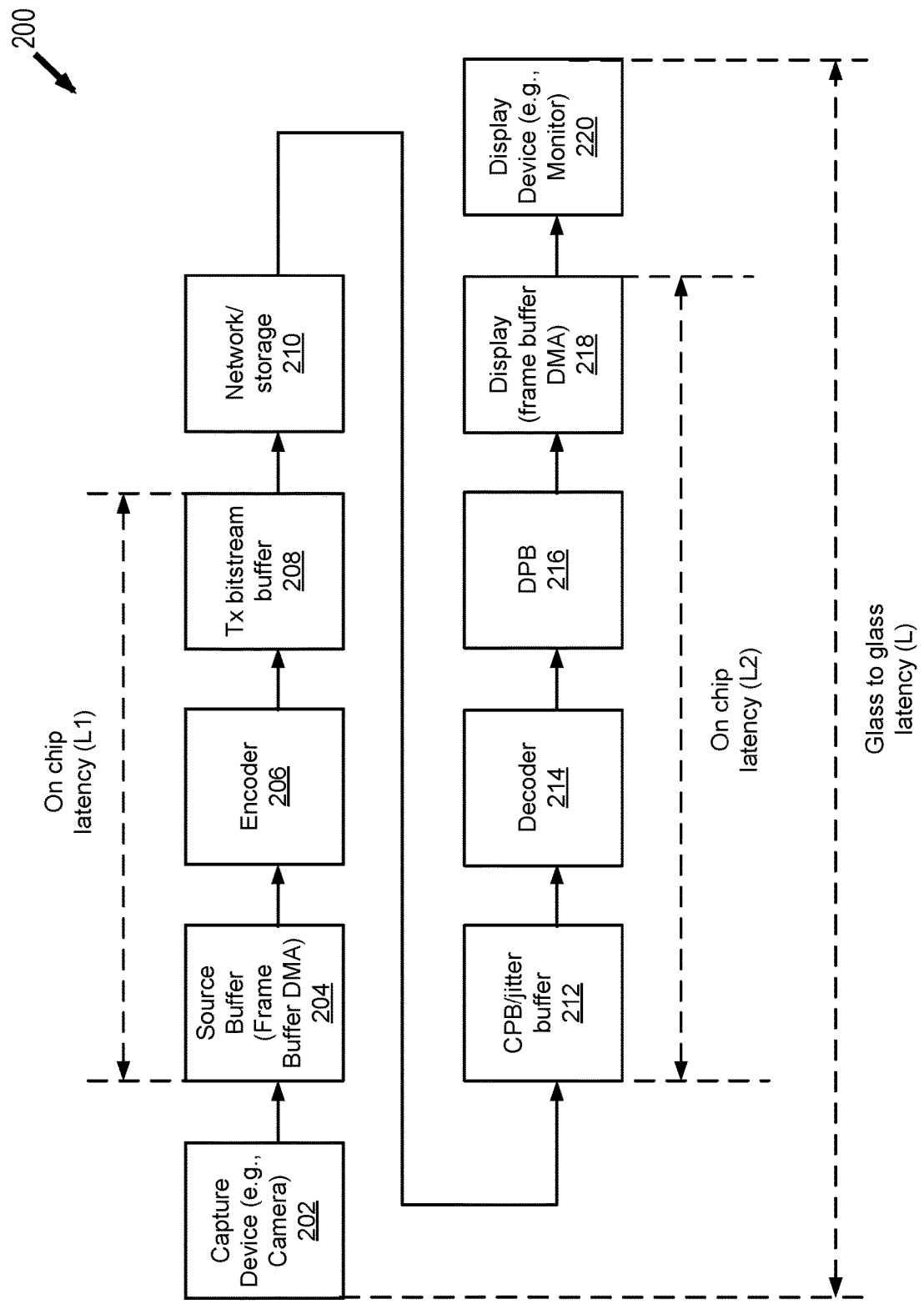
FIG. 2A is a block diagram illustrating an exemplary video codec system according to some embodiments of the present disclosure.

Referring to the example of FIG. 2A, illustrated therein is a video codec system 200 with glass-to-glass latency L from capture device 202 to display monitor 220. The video codec system 200 includes a capture device 202 (e.g., a camera) for capturing input frames. The input frame data is provided to a source buffer 204. An encoder 206 retrieves the input frames from the source buffer 204, and provides encoded frames to the transmitter bitstream buffer 208. The encoded frames are then sent over a network 210 or stored in a storage, which is then provided to a decoder coded picture buffer (CPB) 212. The decoder 214 retrieves encoded data from the CPB 212, performs decoding, and provides decoded frames to decoded picture buffer (DPB) 216. The decoded frames are provided to a display buffer 218, and is sent to a display monitor 220 for display. In some embodiments, component devices 204, 206, and 208 are on one chip, and the latency caused thereof are referred to as on-chip latency L1 of the glass-to-glass latency L. Component devices 212, 214, 216, and 218 may be on another chip, and the latency caused thereof are referred to as on-chip latency L2 of the glass-to-glass latency L.

Figure 2B:
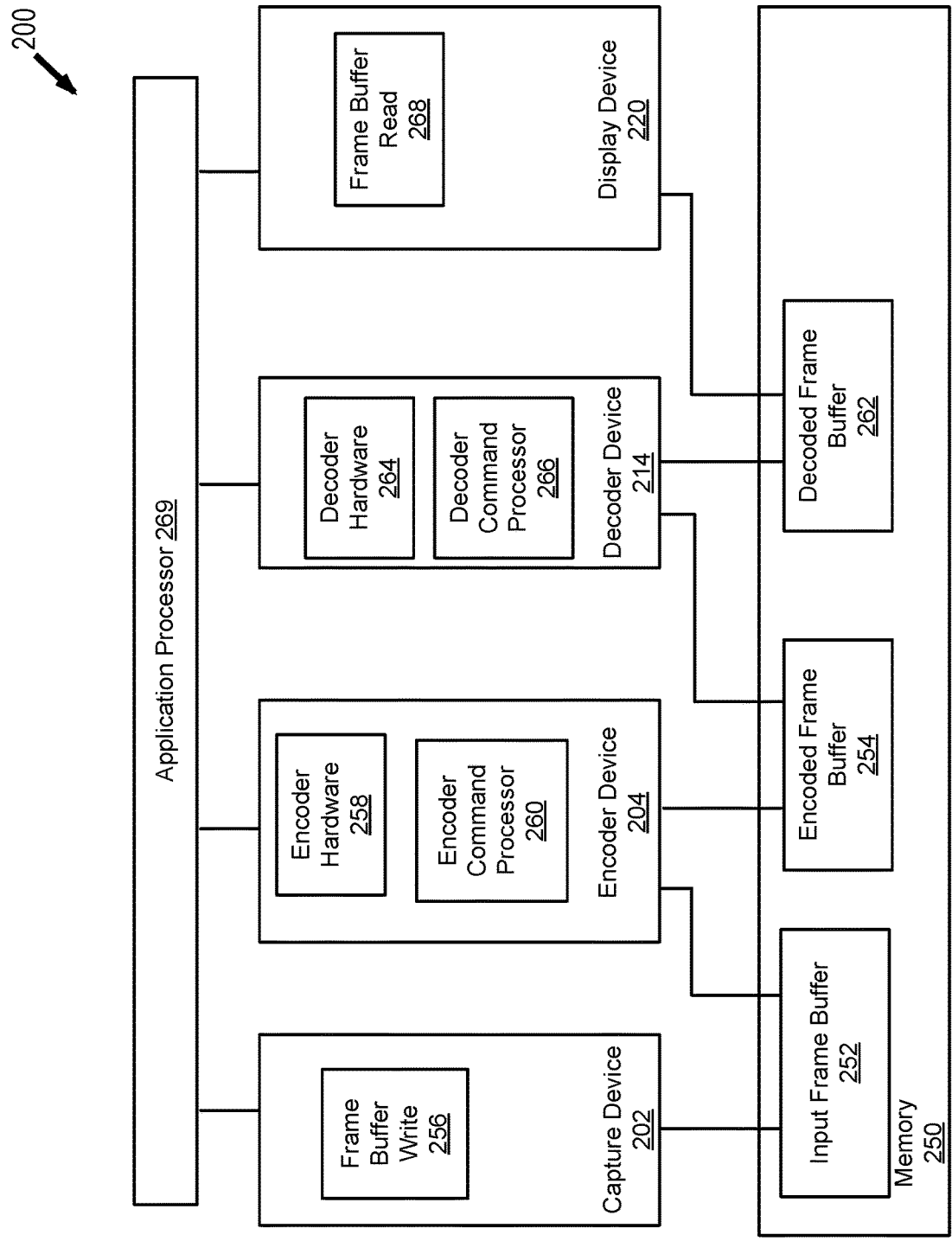
FIG. 2B is a block diagram illustrating an example of a portion of the exemplary video codec system according to some embodiments of the present disclosure.

Referring to the example of FIG. 2B, illustrated is a portion of a video codec system 200 (e.g., video codec system 200 of FIG. 2A), where component devices of the video codec system 200 access the same memory 250 (e.g., a Double Data Rate Synchronous Dynamic Random-Access Memory (DDR SDRAM)).

As shown in FIG. 2B, the video codec system 200 includes a pair of component devices including a capture device 202 and an encoder device 206 accessing the same input frame buffer(s) 252 of the memory 250. In some embodiments, after the capture device 202 captures input frame data, frame buffer write device 256 of the capture device 202 writes the input frame data to input frame buffer 252 of the memory 250. An application processor 269 may determine the frame buffer information (e.g., frame buffer start and end address) associated with the write operation of the input frame data in the capture device 202, and provide that frame buffer information to the encoder device 206, such that the frame buffer information of the input frame data is shared between the capture device 202 and encoder device 206. In some embodiments, the application processor 269 provides, to the encoder command processor 260 of the encoder device 206, encoding commands together with the frame buffer information. In response, the encoder command processor 260 may issue encoding commands (e.g., frame level or frame slice level encoding command) to the encoder hardware 258 using the received frame buffer information. The encoder hardware 258 fetches the input frame data from the input frame buffer 252 (e.g., by performing reading operations based on the frame buffer information), and performs encoding to the fetched input frame data to generate encoded frame data. The encoded frame data is provided to and stored in encoded frame buffer 254 in the memory 250.

As shown in FIG. 2B, the video codec system 200 includes a pair of component devices including a decoder device 214 and a display device 220 accessing the same decoded frame buffer(s) 262. In the example of FIG. 2B, the decoded frame buffer 262 is in the same memory 250 as the input frame buffer 252. In alternative embodiments, the decoded frame buffer 262 is in a memory different from the memory 250 that is coupled to the decoder device 214 and display device 220. The decoder device 214 fetches (e.g., using decoder hardware 264) the encoded frame data from the encoded frame buffer 254 (e.g., through a network or by fetching directly through a bus), and performs (e.g., using processor 266) decoding to the received encoded frame data to generate decoded frame data. The decoded frame data is provided to and stored in a decoded frame buffer 262. An application processor 269 may determine the frame buffer information (e.g., frame buffer start and end address) associated with the write operation of the decoded frame data from the decoder device 214, and provide that frame buffer information to the display device 220, such that the frame buffer information of the decoded frame data is shared between the decoder device 214 and display device 220. The display device 220 fetches (e.g., by using a frame buffer read device 268) the decoded frame data from the decoded frame buffer 262 for display, e.g., based on decoded frame buffer information provided by the application professor 269. In the example of FIG. 2B, a single application processor 269 is used for component devices 202, 204, 214, and 220. In alternative embodiments, separate application processors 269 may be used for separate pairs of component devices.

Figure 2C:
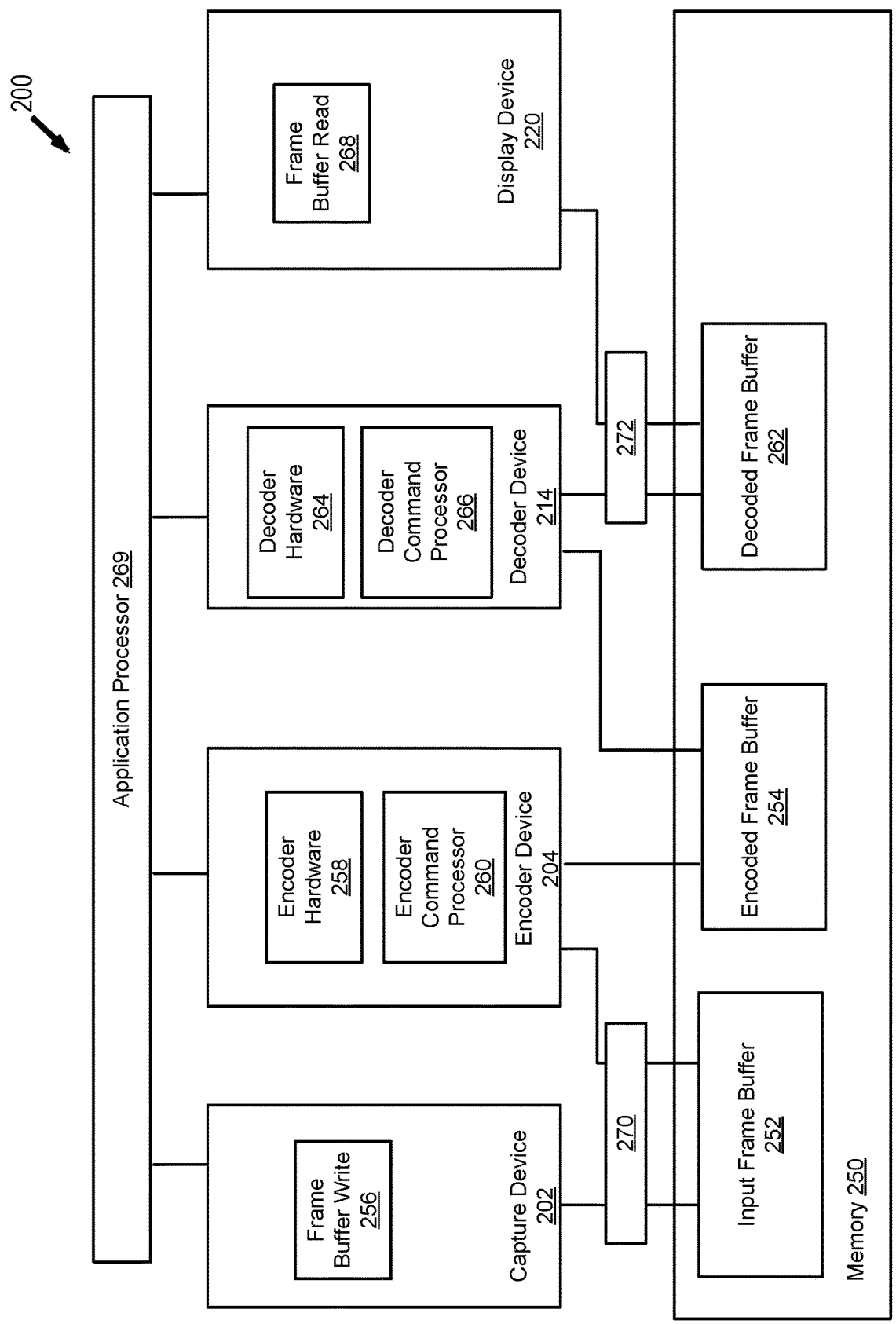
FIG. 2C is a block diagram illustrating another example of a portion of the exemplary video codec system according to some embodiments of the present disclosure.

Referring to the example of FIG. 2C, illustrated is another example of a portion of a video codec system 200, where component devices of the video codec system 200 access the same memory 250. The system of FIG. 2C is substantially similar to the system of FIG. 2B except the differences described below. As shown in FIG. 2C, in some embodiments, a producer-consumer synchronizer 270 is used for synchronizing capture device 202 (which is the producer device) and encoder device 206 (which is the consumer device). As described in detail below, by using the producer-consumer synchronizer 270, the encoder device 206 may start fetching the input frame data from the input frame buffer 252 immediately after the capture device 202 completes writing a valid address into input frame buffer 252 of the memory 250. As such, because the encoder device 206 does not need to wait for the completion of writing the entire input frame to the memory 250 before starting to fetch that particular input frame from the memory 250, latency is reduced.

As shown in FIG. 2C, in some embodiments, a producer-consumer synchronizer 272 is used for synchronizing decoder device 214 (which is the producer device) and display device 220 (which is the consumer device). As described in detail below, by using the producer-consumer synchronizer 272, the display device 220 may start fetching the decoded frame data from the decoded frame buffer 262 immediately after the decoder device 214 completes writing a valid address into the decoded frame buffer 262. As such, because the display device 220 does not need to wait for the completion of writing the entire decoded frame to the memory 250 before starting to fetch that particular decoded frame from the memory 250, latency is reduced.

Figure 3:
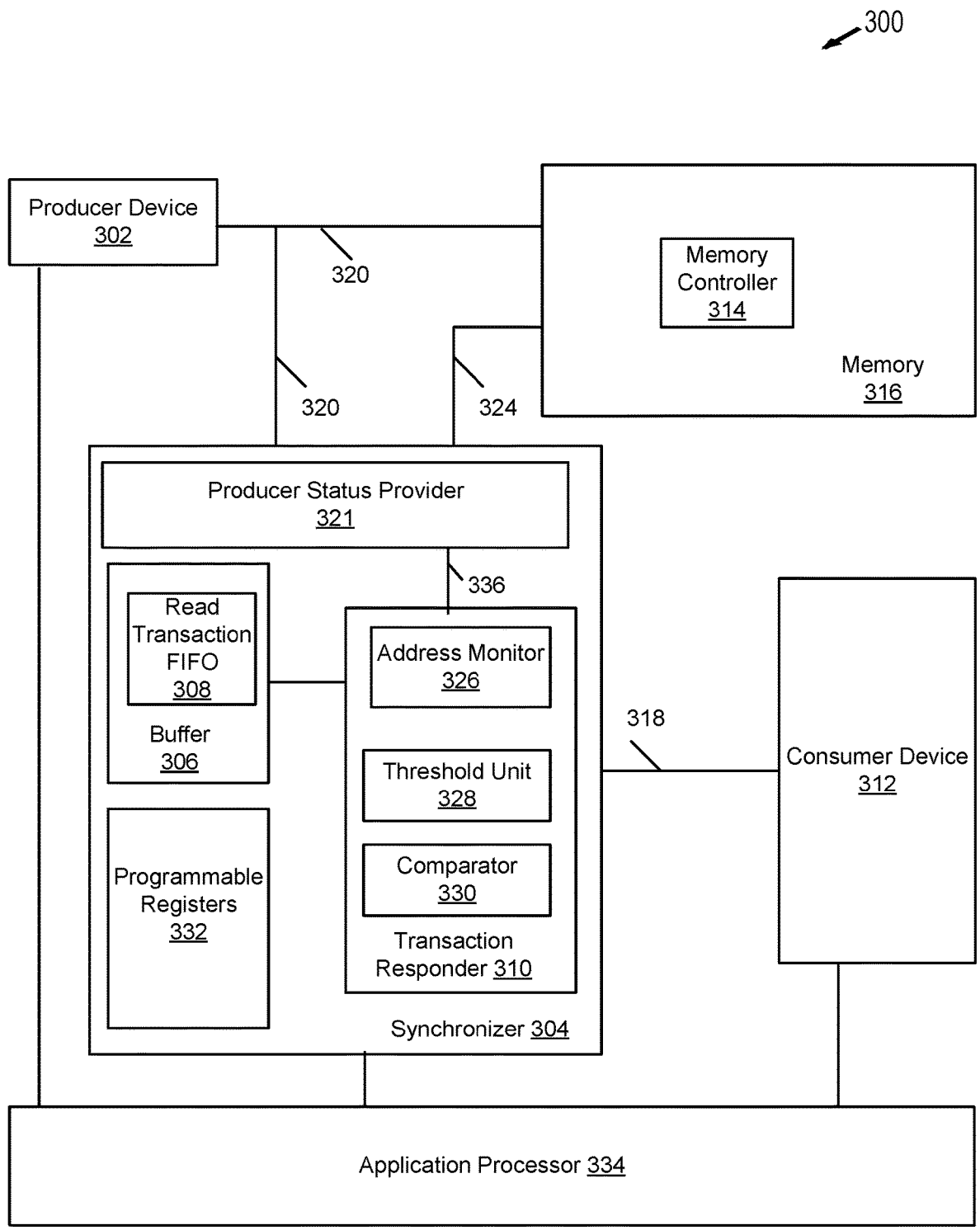
FIG. 3 is a block diagram illustrating an exemplary producer-consumer synchronization system according to some embodiments of the present disclosure.

Referring to the example of FIG. 3, a producer-consumer synchronization system 300 is illustrated. In various embodiments, a video codec system 200 may include one or more of such a producer-consumer synchronization system 300. For example, in the example of FIG. 2C, a video codec system 200 includes a producer-consumer synchronization system 300, which includes the decoder device 214 (as the producer device 302), encoder device 206 (as the consumer device 312), and a producer-consumer synchronizer 270. For further example, in the example of FIG. 2C, the video codec system 200 includes another producer-consumer synchronization system, which includes the decoder device 214 (as the producer device 302), the display device 220 (as the consumer device 312), and a producer-consumer synchronizer 272.

As shown in FIG. 3, a producer-consumer synchronization system 300 includes a producer device 302, a producer-consumer synchronizer 304 (also referred to as a synchronizer 304), a consumer device 312, and a memory 316. The producer device 302 is coupled to the memory 316 through a bus 320 (also referred to as a producer bus 320), and may perform write transactions to write frame data to the memory 316 by sending write requests through the bus 320. The consumer device 312 is coupled to the memory 316 through a bus 318 (also referred to as a consumer bus 318), and may perform read transactions to read frame data from the memory 316 by sending read requests through the bus 318. Each of the buses 318 and 320 may be an Advanced Extensible Interface (AXI) bus of Advanced Microcontroller Bus Architecture (AMBA). A frame write request for writing a single frame to the memory 316 may be performed using a plurality write transactions through the producer bus 320. Similarly, a frame read request for reading a single frame from the memory 316 may be performed using a plurality of read transactions through the consumer bus 318.

Figure 4:
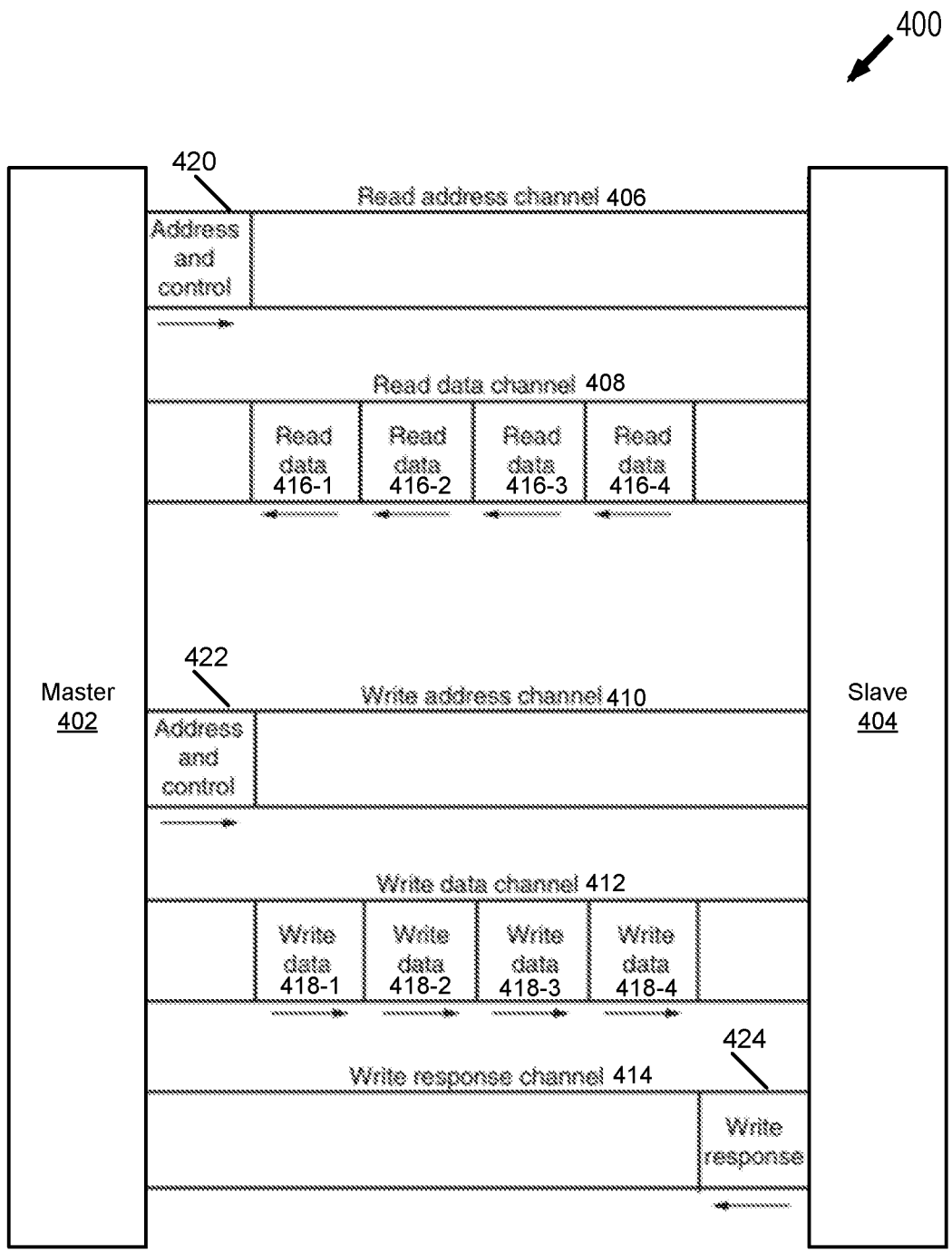
FIG. 4 is a block diagram illustrating an exemplary bus interface used in producer-consumer synchronization system of FIG. 3 according to some embodiments of the present disclosure.

Referring to the example of FIG. 4, illustrated is a bus interface 400 (e.g., implemented by buses 318, 320, and 324 of FIG. 3). The bus interface 400 may be an AXI bus for memory-mapped communication (with a slave device including a memory). As shown in FIG. 4, the bus interface 400 includes a master device 402 (e.g., a synchronizer 304) and a slave device 404 (e.g., a memory 316). For performing read transactions to read data from the slave device 404, the bus interface 400 provides read address channel 406 and read data channel 408 between the master device 402 and slave device 404.

For performing write transactions to write data to the slave device 404, the bus interface 400 provides write address channel 410, write data channel 412, and write response channel 414. The write address channel 410 may be used to communicate address and control information 422. The address and control information 422 of the write address channel 410 may include variation write transaction information, including e.g., a transaction identifier (e.g., AWID of AXI), a transaction start address (e.g., AWADDR of AXI), a transaction length (e.g., AWLEN of AXI), a transaction data width (e.g., AWSIZE of AXI). The write data channel 412 may be used to communicate write data information for single or multiple data transfers (e.g., 4 data transfers for transferring write data 418-1 through 418-4). The write response channel 414 may be used to communicate write response information 424.

In the example of bus interface 400, the read and write transaction sizes may be configured to have any suitable number of data transfers. In an example, the transaction size limit may be of a burst transaction of N data transfers. In another example, the transaction size includes only 1 data transfer per transaction.

As shown in the example of FIG. 4, the bus interface 400 provides separate data and address channels for each of read and write transactions. As such, data may move in both read and write directions between the master device 402 and slave device 404 simultaneously. In the example of FIG. 4, a read transaction includes a burst transaction of 4 data transfers for transferring 4 read data 41601 through 416-4.

A write transaction includes a burst transaction of 4 data transfers for transferring 4 write data 418-1 through 418-4.

As shown in the example of FIG. 3, in some embodiments, a synchronizer 304 includes a producer status provider 321, which provides the status of write transactions from the producer device 302 to the memory 316 based on information on the producer bus 320. The producer status provider 321 may check for valid address range detection of a write transaction on the producer bus 320 based on address and control information 422 (including e.g., AWVALID, AWREADY, and AWLEN values) of the write address channel 410 of the producer bus 320. For example, AWVALID signal may indicate that the write address channel 410 is signaling valid write address and control information, AWREADY signal may indicate that the slave is ready to accept an address and associated control signals, and AWLEN indicates the number of data transfers associated with the address. In some embodiments, based on the valid address range detection check from the producer status provider 321, a threshold counter (e.g., a threshold unit 328 of the transaction responder 310) may start incrementing the corresponding address threshold.

In some embodiments, the producer status provider 321 provides a write transaction completion signal 336 indicating the completion of the write transaction. The producer status provider 321 may determine the write transaction completion status based on write response information 424 (including e.g., BID, BVALID, BREADY and BRESP values) of the write response channel 414 of the producer bus 320. For example, BID signal may provide an identifier of the write response, BVALID signal may indicate that the channel is signaling a valid write response, BREADY signal may indicate that the master can accept a write response, and BRESP signal may indicate the status of the write transaction (e.g., failed, succeeded, etc.). In some embodiments, the producer bus 320 supports out of order transactions, and the producer status provider 321 determines which write transaction the write response information 424 is associated (e.g., based on AWID of write address channel and/or BID of write response channel).

In some embodiments, the synchronizer 304 includes a transaction responder 310, which may be coupled to the consumer bus 318 and/or producer bus 320. An address monitor 326 of the transaction responder 310 may monitor the start address of a write transaction sent through the producer bus 320, and determine an address range of the write addresses of that write transaction based on a transaction size of the write transaction.

In some embodiments, a threshold unit 328 of the synchronizer 304 determines a threshold value indicating an end address of that particular write transaction. The address monitor 326 of the synchronizer 304 may monitor the consumer bus 318, and determine a read address of a frame read request through the consumer bus 318 from the consumer device 312.

In some embodiments, a comparator 330 of the transaction responder 310 may compare the read address and the address threshold (e.g., computed based on the write transaction start address and write transaction size).

In some embodiments, the comparator 330 determines that the read address is less than the address threshold, the read transactions of the frame read request from the consumer device 312, the synchronizer 304 allows the read transactions to be sent to the memory 316 (e.g., through a bus 324 between the synchronizer 304 and the memory 316).

In some embodiments, the comparator 330 determines that the read address is not less than the address threshold, the read transactions of the frame read request from the consumer device 312 are sent to a read transaction FIFO buffer 308 of a buffer 306 of the synchronizer 304. In those embodiments, the read transactions wait in the read transaction FIFO buffer 308 until the producer device 302 finishes writing the write transactions into the address range of the memory 316. After the producer device 302 finishes writing the write transactions into the address range of the memory 316, read transactions are retrieved from the read transaction FIFO buffer 308, and sent to the memory 316 to perform the read transactions for the consumer device 312.

In some embodiments, read transactions through consumer bus 318 from the consumer device 312 may be associated with a read request other than a frame read request. The transaction responder 310 may determine whether a read transaction from the consumer bus 318 is a source frame type (e.g., based on AXI identifier (ID)) associated with retrieving a frame from the memory 316. In response to a determination that the read transaction is not a source frame type, the transaction responder 310 passes the read transaction to the memory controller 314 (e.g., a DDR controller) for the memory 316 (e.g., a DDR memory), without performing the comparison (e.g., by comparator 330) or saving to the read transaction FIFO 308. On the other hand, in response to a determination that the read transaction is a source frame type, the transaction responder 310 stores the read transaction in the corresponding FIFO 308 if the producer device is not ready (e.g., based on comparing the read address and the address threshold by the comparator 330). If the producer device is ready, the transaction responder 310 issues a FIFO read command to read the transaction from the FIFO 308, and provide the read transaction into the bus 324 coupled to the memory 316. The memory 316 includes a memory controller 314 for performing read and write operations to the memory 316.

In some embodiments, the synchronizer 304 includes programmable registers 332 for storing a list of frame buffer addresses (e.g., including frame buffer start address and end address), which may be updated by the application processor 334. In some embodiments, the programmable registers 332 stores frame buffer information for N frame buffers of the memory 316, where each frame buffer may be used to store a single frame. The producer device 302 may use the list of the frame buffer addresses in the programmable registers 332 to determine the write addresses of the frames to be written in the memory. After frame data equal to a frame buffer depth is written into the memory, the next frame buffer address is used.

Figure 5:
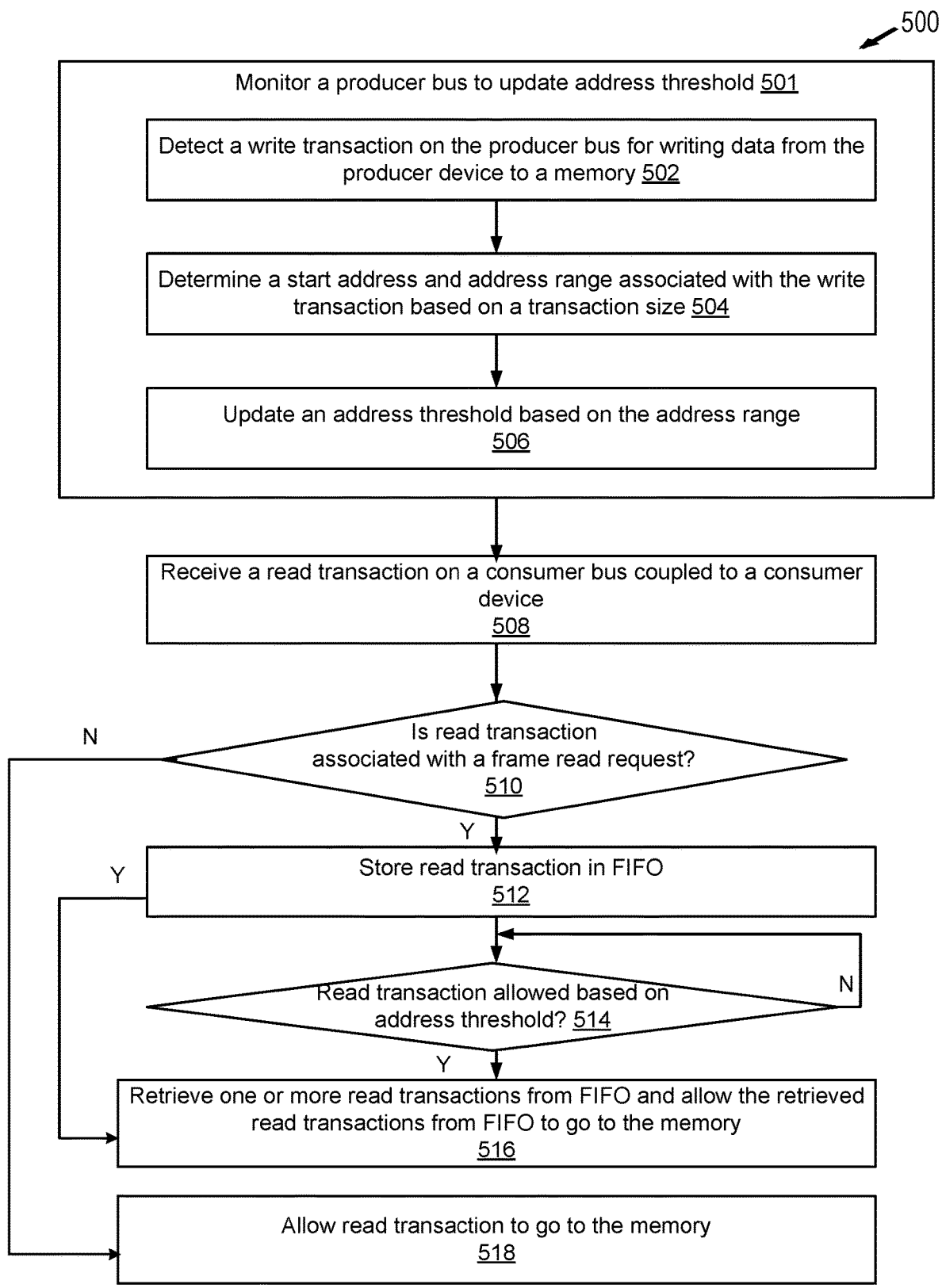
FIG. 5 is a flowchart illustrating an exemplary producer-consumer synchronization method using the producer-consumer synchronization system of FIG. 3 according to some embodiments of the present disclosure.

Referring to the example of FIG. 5, a method 500 for providing producer-consumer synchronization (e.g., using a producer-consumer synchronization system 300 of FIG. 3) is illustrated. The method 500 begins at block 501, where a synchronizer 304 of the synchronization system 300 monitors the write transaction(s) on the producer bus 320, and updates an address threshold indicating the occupancy of a memory 316.

The method 501 includes blocks 502, 504, and 506, which continuously monitors the producer bus 320 and updates an address threshold indicating the occupancy of a memory 316 with detected write transaction(s) on the producer bus 320. At block 502, the address monitor 326, together with producer status provider 321 of the synchronizer 304, detects a write transaction on the producer bus 320. In various embodiments, the write transaction is one of a plurality of write transactions of a frame write request from a producer device 302 for writing a frame to the memory 316. The method of block 501 may proceed to block 504, where the address monitor 326 determines the start address of the write transaction (e.g., based on AWADDR of the address and control information 422 of the write address channel 410) on producer bus 320. The address monitor 326 also determines an address range in the memory 316 associated with the write transaction based on a transaction size of the write transaction. In an example, the write transaction is a burst write transaction including a burst number of data transfers. In that example, an address range may be computed as follows:

$$\text{Address\_Range}=(\text{AWLEN})*\text{DATA\_TRANSFER\_SIZE}.$$

where AWLEN of address and control information 422 of the write address channel 410 provides a burst number (e.g., 4), which indicates the number of data transfers in a burst write transaction, and DATA_TRANSFER_SIZE is the size of each data transfer in the burst write transaction. In an example, the DATA_TRANSFER_SIZE may be computed as $2^{(AWSIZE)}$, where AWSIZE is a parameter of address and control information 422 of the write address channel 410. In an example, AWSIZE has a value of 4 for a 16-byte data transfer. In the example where AWLEN is 4 and DATA_TRANSFER_SIZE is 16 bytes (e.g., AWSIZE is 4), the address range is 4*16, which is 64 bytes.

The method 501 proceeds to block 506, where an address threshold is determined. The address threshold indicates a last address of the last completed write transaction, where memory write operations to the memory for the data of that write transaction have completed. Note that in examples where the current write transaction is being sent to the memory and/or has not completed writing the corresponding data to the memory, the address threshold is different from the last address of the current write transaction, because the address threshold is updated only after the write transaction has completed writing data to the memory.

In some embodiments, at block 506, in the synchronization system 300, a threshold unit 328 determines an address threshold indicating a last address of the last completed write transaction. In some embodiments, the address threshold is updated after receiving a write response 424 for the corresponding write transaction indicating that the write transaction has completed, and thereby indicates the occupancy of the memory or a portion thereof (e.g., occupancy of a frame buffer 252 of memory 250). As such, the address threshold is also referred to as occupancy threshold. In an example, the address threshold is stored in a storage device (e.g., a register) in a producer device, and the address threshold value stored in the storage device is updated after receiving a write transaction complete indication from the write response 424 as follows:

$$\text{Updated\_Address\_Threshold}=\text{Requested\_Address}+\text{Address\_Range},$$

where Requested_Address is the start address of the write transaction of address control information 422 of the write operation.

In some embodiments, Updated_Address_Threshold is initialized with a start address of the corresponding frame buffer of the memory for the pair of producer/consumer devices. In some examples, the Updated_Address_Threshold is less than a starting address of the corresponding frame buffer of the memory for the pair of producer/consumer devices, the Updated_Address_Threshold will be set to the value of the starting address of the corresponding frame buffer of the memory. In hardware implementation, this operation may be performed using a maximum operation (e.g., using a comparator) as max(start_address_frame_buffer, Updated_Address_Threshold).

In some embodiments, the producer device provides a signal (e.g., a pulse) to the consumer device indicating that the Updated_Address_Threshold corresponding to the memory (or frame buffer) commonly used by the producer device and consumer device is valid, and can be used by the consumer device.

In some embodiments, as shown in the example of FIG. 2C, the memory 250 includes multiple frame buffers including input frame buffer 252, encoded frame buffer 254, and decoded frame buffer 262, where write/read operations to those frames buffers may be performed in parallel. Each frame buffer is associated with a producer device for writing frames to that frame buffer, and a consumer device for reading frames from that frame buffer. For each frame buffer, a separate Updated_Address_Threshold is used to indicate the occupancy threshold of that particular frame buffer.

In some examples, where multiple frame addresses for the same frame buffer are generated from a producer device, each frame address may have a corresponding Updated_Address_Threshold. Those Updated_Address_Thresholds may be stored in the same First In First Out (FIFO) buffer, to ensure the order of the transactions for those frame addresses are maintained.

The method 500 may proceed to block 508, where a read address of a read transaction on a consumer bus coupled to a consumer device is determined. For example, at block 508, in the synchronization system 300, an address monitor 326 monitors the consumer bus 318 (e.g., based on address and control information 420 of read address channel 406 of the consumer bus 318), and determines a read address of a read transaction on the consumer bus 318.

The method 500 proceeds to block 510, where it is determined whether the read transaction is associated with a frame read request for reading source frames from the memory. For example, at block 510, in the synchronization system 300, a transaction responder 310 of the synchronizer 304 determines whether the read transaction on the consumer bus 318 is associated with a frame read request (e.g., one of the read transactions for performing that frame read request of reading a particular frame) for reading a particular frame from the memory 316. In an example where the consumer bus 318 is an AIX bus, such a determination may be made based on the AXI ID of the address and control information 420 of the read address channel 406 of the read transaction. As discussed in detailed below, by storing read transactions of frame read requests in a FIFO 308 and allowing other read transactions to pass through to the memory 316, possible dead-locks that may be caused by de-asserting a read address ready signal in read address channel 406 (e.g., ARREADY indicating that the slave is ready to accept an address and associated control signals) on bus 324 are avoided.

In some examples, at block 510, it is determined that the read transaction is not associated with a frame read request. In those examples, the method 500 proceeds to block 518 to allow the read transaction from the consumer bus 318 to go to the memory. For example, at block 518, in the synchronization system 300, the transaction responder 310 of synchronizer 304 sends the read transaction from the consumer bus 318 to the memory 316 using a bus 324.

In some examples, at block 510, it is determined that the read transaction is associated with a frame read request. In those examples, the method 500 proceeds to block 512 to store the read transaction in a FIFO. For example, at block 512, in the synchronizer 304 of the synchronization system 300, the transaction responder 310 stores the read transaction from the consumer bus 318 in a read transaction FIFO 308.

The method 500 proceeds to block 514, where it is determined whether a read transaction is allowed to be sent to the memory based on the address threshold (e.g., Updated_Address_Threshold). In an example, the determination is based on a comparison between the read address and the address threshold of the corresponding memory or frame buffer for that read transaction. For example, at block 514, in the synchronizer 304 of the synchronization system 300, a comparator 330 of the transaction responder 310 compares the read address and address threshold (e.g., provided by the threshold unit 328), and outputs a comparison result indicating whether the read address is less than the address threshold.

In some examples, at block 514, it is determined that the read address is greater than the address threshold. In those examples, the transaction responder 310 determines that the requested data by the frame read request from the consumer device has not been written to the memory 316. In response, the transaction responder 310 blocks that frame read request from sending to the memory (e.g., by sending a data not valid signal to the memory and/or memory not ready signal to the consumer device), and continues to perform the comparison between the read address and updated address threshold (e.g., updated by block 501).

In some examples, at block 514, it is determined that the read address is less than the address threshold. In those examples, the transaction responder 310 determines that the producer device 302 has completed performing a write transaction for the requested data at the requested read address. In response to the determination, the method 500 proceeds to block 516. In some embodiments, the transaction responder 310 retrieves one or more read transactions from the FIFO 308, and sends the retrieved read transactions from the FIFO 308 to the memory 316 using a bus 324. The transaction responder 310 may also send a data valid signal to the memory and a memory ready signal to the consumer device. It is noted that while in some examples the retrieved read transaction from the FIFO 308 corresponds to the read transaction having the requested read address (e.g., while the FIFO 308 only has 1 read transaction), in some examples, the retrieved read transaction from the FIFO 308 may be different from the read transaction having the requested read address (e.g., while the FIFO 308 has more than 1 read transactions). In an example, the transaction responder 310 may retrieve all the read transactions in FIFO 308 and send them to the memory while maintaining the order of those read transactions (e.g., received from the bus 318).

Accordingly, by monitoring the memory occupancy to generate an address threshold level based on information from the producer bus 320 and un-gating the frame read requests from the consumer device 312 based on that address threshold level, synchronization between producer device and consumer device for accessing a shared memory is achieved. Furthermore, by enabling the consumer device 312 to start fetching a frame (e.g., using a plurality of read transactions) from the memory immediately after the producer device 302 completes a corresponding write transaction for a first transaction of that frame into the memory 316 (e.g., determined based on write response information 424 of write response channel 414 of the producer bus 320), latency is reduced.

Referring to the example of FIG. 6, in some embodiments, the synchronizer 304 includes a programmable register 332 that stores a list of buffer addresses of the memory 316. The producer device 302 may use that list of buffer addresses to determine write addresses of buffers in the memory for corresponding frame data. In an example, the producer device 302 may switch from one buffer address to the next buffer address once frame data equal to a buffer depth is written into the memory 316. In the example of FIG. 6, a separate list of addresses for luma buffers and chroma buffers in the memory 316 are maintained for storing luma and chroma data of the video data, where luma buffers and chroma buffers may not be contiguous in the memory. The programmable register 332 includes luma start addresses 602 and luma end addresses 608 for the addresses of one or more luma buffers in the memory 316, and include chroma start addresses 604 and chroma end addresses 612 for the chroma buffers in the memory 316. The synchronizer 304, together with the producer device 302 and consumer device 312, treats each of the luma and chroma buffers in a buffer ring as a separate buffer, and those buffers are tracked in parallel. In some embodiments, the list of frame buffer addresses in the programmable registers 332 may be scanned (e.g., by the producer device or the synchronizer) in a rotating sequence by the producer device 302. If a frame buffer address entry indicates that the corresponding address is not valid, the producer device 302 may skip that entry and move to the next address, but providing the skip information (e.g., using a "Skip" bit in an Interrupt Service Routine (ISR)) to the application professor 334.

In some embodiments, the programmable register 332 includes a control register 606, a buffer region 610, and an interrupt status register 614. The control register 606 may store synchronizer control information provided by the application professor 334. In an example, the synchronizer control information may be used to disable or enable the synchronizer 304. The buffer region 610 may be used to accommodate lag by reading operations of the consumer device. The interrupt status register 614 may be used to send a frame synchronization complete interrupt signal to the application processor indicating that synchronization of a frame is complete. In an example, the completion of the synchronization of a frame may be determined based on the completion of a last read transaction of the frame read request (e.g., using the end addresses of the frame buffers of the programmable register 332).

As shown in the example of FIG. 2C, a video codec system 200 may include one or more producer-consumer synchronization systems. For example, the video codec system 200 may include a first producer-consumer synchronization system (also referred to as a capture-encode synchronization system) with a producer-consumer pair including a capture device 202 (as the producer device), an encoder device 206 (as the consumer device), and synchronizer 270. For further example, the video codec system may include a second producer-consumer synchronization system (also referred to as a decode-display synchronization system) with a producer-consumer pair including a decoder device 214 (as the producer device), a display device 220 (as the consumer device), and synchronizer 272. In some embodiments, the capture-encode synchronization system does not include out of order transactions, while tee decode-display synchronization system includes out of order transactions (e.g., in a producer bus, the write responses 424 in write response channel 414 from the memory may not be in the same order as the write transactions sent in the write address channel 410). As such, in the decode-display synchronization system, the synchronizer 272 may match the write responses to the corresponding write transactions based on the transaction identifiers (e.g., BID in the write response channel 414 and AWID in the write address channel 410).

In some embodiments, in the decode-display synchronization system, the synchronizer 272 may ensure that a display controller of the display device 220 has a delay (e.g., ½ of a frame delay) from the decoder device 214. Such a delay is configured to ensure that any variation in the decoding rate of the decoder device 214 is absorbed within that delay, and as a result, the display controller does not underrun if the decoder is slow. The application processor may be used to program video timing signals (e.g., vertical sync (VSYNC) timing signal, horizontal sync (HSYNC) timing signal, etc.) such that the new video timing signals are offset by half a frame from the decoder start event. The synchronizer 272 may detect and report an error if the display controller tries to access a buffer in the memory that is not written by the decoder. An address tracking mechanism is used in the decode-display synchronization system to detect such synchronization errors. In some embodiments, such an error detection system is not used in the capture-encoder synchronization system of the same video codec system because the encoder device only read data from the memory that is written by capture device.

In some embodiments, in the decode-display synchronization system, the producer device (decoder device) may have two producer ports for two parallel producer threads, which may correspond to the same video channel or separate video channels. For the display device with two ports for display, each read port may be dedicated to a particular video channel, and as such, the addresses may be decoded to identify the particular video channel associated with a particular display port. As such, the decode-display synchronization system may support multiple video channels.

In some embodiments, in the capture-encode synchronization system, the encoder device includes two or more encoding processors (e.g., encoding cores) that may encode in parallel. In those embodiments, the buffer (e.g., buffer 306) in the synchronizer 270 may include two or more read transaction FIFOs for storing the frame read requests from the two or more encoding processors respectively. An encoder port coupled to the consumer bus 318 handles bus requests from the two or more encoding processors. The consumer bus 318 may be multiplexed between the two or more encoding processors, and storing the frame read requests in the corresponding FIFOs may avoid deadlock that may be caused by using two or more encoding processors. In some embodiments, the synchronizer 270 may identify a read transaction for a specific encoding processor of the encoder device based on the transaction identifier (e.g., most significant bit (MSB) of the AXI ID of the read transaction). In some embodiments, when non-frame-read transactions and multiple frame read transactions stored in multiple separate FIFOs respectively become available at the same time, round robin arbitration may be used to dispatch those transactions from different sources.

It is noted that various configurations illustrated in FIGS. 1-6 are exemplary only and not intended to be limiting beyond what is specifically recited in the claims that follow. It will be understood by those skilled in that art that other configurations may be used. While a video codec system is used as an example for using the producer-consumer synchronization system, the producer-consumer synchronization system may be used for non-video data transmission and storage (e.g., for receiving Ethernet packets over a network and storing into a Serial AT Attachment (SATA) drive.

One or more elements in the various embodiments may be implemented by software, hardware (e.g., an application specific integrated circuit (ASIC), application-specific standard parts (ASSPs), a logic on a programmable logic IC (e.g., FPGA)), firmware, and/or a combination thereof. The embodiments may be implemented using various hardware resources, such as for example DSP slices, BRAM, and programmable resources of an FPGA; however, in other embodiments, digital signal processors, microprocessors, multi-core processors, memory, and/or other hardware may be used. When implemented in software, the elements of the embodiments of the invention are essentially the code segments to perform the necessary tasks. The program or code segments can be stored in a processor-readable storage medium or device that may have been downloaded by way of a computer data signal embodied in a carrier wave over a transmission medium or a communication link. The processor readable storage device may include any medium that can store information including an optical medium, semiconductor medium, and magnetic medium. Processor readable storage device examples include an electronic circuit; a semiconductor device, a semiconductor memory device, a read-only memory (ROM), a flash memory, an erasable programmable read-only memory (EPROM); a floppy diskette, a CD-ROM, an optical disk, a hard disk, or another storage device. The code segments may be downloaded via computer networks such as the Internet, Intranet, etc.

Although particular embodiments have been shown and described, it will be understood that it is not intended to limit the claimed inventions to the preferred embodiments, and it will be obvious to those skilled in the art that various changes and modifications may be made without department from the spirit and scope of the claimed inventions. The specification and drawings are, accordingly, to be regarded in an illustrative rather than restrictive sense. The claimed inventions are intended to cover alternatives, modifications, and equivalents.

What is claimed is:

1. A system, comprising:
 a synchronizer circuit configured to:
  monitor a first bus coupled between a memory and a first device to determine an occupancy threshold of the memory based on one or more write requests from the first device, wherein the determining the occupancy threshold includes:
  updating the occupancy threshold based on one or more write transactions of a first write request detected on the first bus;
  monitor a second bus between the memory and a second device to receive a first read transaction of a read request from the second device;
  determine that the first read transaction is allowed to be sent to the memory based on the occupancy threshold of the memory,
  wherein in response to the determination, the first read transaction is sent to the memory.

2. The system of claim 1, wherein to monitor the first bus to determine the occupancy threshold of the memory, for each write transaction of the first write request detected on the first bus, the synchronizer circuit is configured to:
 determine a transaction size of the write transaction; and
 update the occupancy threshold based on the transaction size.

3. The system of claim 2, wherein the first read transaction is associated with a frame read request for reading a first frame of a video from the memory, and wherein the first read transaction starts to perform reading from the memory before the first frame is completely written to the memory.

4. The system of claim 2, wherein each write transaction is associated with a frame write request for writing a frame to the memory, and
wherein the frame write request includes a plurality of write transactions for writing portions of the frame to the memory respectively.

5. The system of claim 2, wherein the first bus is an Advanced Extensible Interface (AXI) bus, and
wherein the transaction size of the write transaction is determined based on a burst number indicating a number of data transfers in the write transaction.

6. The system of claim 1, wherein the synchronizer circuit is configured to:
store the first read transaction in a first-in-first-out (FIFO) buffer;
in response to the determination that the first read transaction is allowed to be sent to the memory, retrieve a second read transaction from the FIFO buffer and send the retrieved second read transaction to the memory.

7. The system of claim 6, wherein the synchronizer circuit is configured to:
in response to a determination that the second read transaction is not allowed to be sent to the memory based on the occupancy threshold of the memory, blocking the second read transaction from being sent to the memory.

8. The system of claim 1, wherein the first device includes a capture device for capturing a plurality of frames of a video and storing the plurality of frames in the memory, and
wherein the second device includes an encoder device for retrieving the plurality of frames from the memory and encoding the plurality of frames.

9. The system of claim 1, wherein the first device includes a decoder device for decoding encoded frames of a video and storing the decoded frames in the memory, and
wherein the second device includes a display device for retrieving the decoded frames from the memory for display.

10. The system of claim 9, further comprising:
a capture device for capturing a plurality of frames of a video and storing the plurality of frames in the memory;
an encoder device for retrieving the plurality of frames from the memory and encoding the plurality of frames; and
a capture-encode synchronizer circuit configured to monitor third and fourth buses for scheduling one or more read transactions from the encoder device,
wherein the memory is coupled to the capture device and encoder device using the third and fourth buses respectively.

11. A method, comprising:
monitoring a first bus coupled between a memory and a first device to determine an occupancy threshold of the memory based on one or more write requests from the first device,
wherein the determining the occupancy threshold includes:
updating the occupancy threshold based on one or more write transactions of a first write request detected on the first bus;
monitoring a second bus between the memory and a second device to receive a first read transaction of a read request from the second device;

determining that the first read transaction is allowed to be sent to the memory based on the occupancy threshold of the memory; and
in response to the determination, sending the first read transaction to the memory.

12. The method of claim 11, wherein the monitoring the first bus to determine the occupancy threshold of the memory includes:
for each write transaction detected on the first bus,
determining a transaction size of the write transaction; and
updating the occupancy threshold based on the transaction size.

13. The method of claim 12, wherein the first read transaction is associated with a frame read request for reading a first frame of a video from the memory, further comprising:
starting to read data associated with the first read transaction from the memory before the first frame is completely written to the memory.

14. The method of claim 12, wherein each write transaction is associated with a frame write request for writing a frame to the memory, and
wherein the frame write request includes a plurality of write transactions for writing portions of the frame to the memory respectively.

15. The method of claim 12, wherein the first bus is an Advanced Extensible Interface (AXI) bus, and
wherein the transaction size of the write transaction is determined based on a burst number indicating a number of data transfers in the write transaction.

16. The method of claim 11, further comprising:
storing the first read transaction in a first-in-first-out (FIFO) buffer;
in response to the determination that the first read transaction is allowed to be sent to the memory, retrieving a second read transaction from the FIFO buffer and sending the retrieved second read transaction to the memory.

17. The method of claim 16, further comprising:
in response to a determination that the second read transaction is not allowed to be sent to the memory based on the occupancy threshold of the memory, blocking the second read transaction from being sent to the memory.

18. The method of claim 11, wherein the first device includes a capture device for capturing a plurality of frames of a video and storing the plurality of frames in the memory, and
wherein the second device includes an encoder device for retrieving the plurality of frames from the memory and encoding the plurality of frames.

19. The method of claim 11, wherein the first device includes a decoder device for decoding encoded frames of a video and storing the decoded frames in the memory, and
wherein the second device includes a display device for retrieving the decoded frames from the memory for display.

20. The method of claim 19, further comprising:
capturing, by a capture device, a plurality of frames of a video and storing the plurality of frames in the memory;
retrieving, by an encoder device, the plurality of frames from the memory and encoding the plurality of frames; and
monitoring third and fourth buses for scheduling one or more read transactions from the encoder device, wherein the memory is coupled to the capture device and encoder device using the third and fourth buses respectively.

\* \* \* \* \*